(12) United States Patent
Okaniwa et al.

(10) Patent No.: US 7,852,550 B2
(45) Date of Patent: Dec. 14, 2010

(54) OPTICAL AMPLIFYING APPARATUS

(75) Inventors: Takeo Okaniwa, Tokyo (JP); Jie Wu, Shanghai (CN); Nobuyuki Kagi, Tokyo (JP); Toru Yoshikawa, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 314 days.

(21) Appl. No.: 12/014,514

(22) Filed: Jan. 15, 2008

(65) Prior Publication Data

US 2008/0205460 A1 Aug. 28, 2008

Related U.S. Application Data

(63) Continuation of application No. PCT/JP2007/052764, filed on Feb. 15, 2007.

(30) Foreign Application Priority Data

Feb. 17, 2006 (JP) .............................. 2006-041146

(51) Int. Cl.
*H01S 3/00* (2006.01)
(52) U.S. Cl. .................................... 359/341.4; 398/202
(58) Field of Classification Search .............. 359/341.4, 359/333, 341.1; 398/202
See application file for complete search history.

(56) References Cited

U.S. PATENT DOCUMENTS 5,313,386 A 5/1994 Cook et al.

| 2003/0011880 A1* | 1/2003 | Kim et al. ............... 359/341.41 |
| 2004/0066551 A1* | 4/2004 | Lelic et al. ............. 359/341.41 |
| 2005/0254828 A1* | 11/2005 | Brekelmans et al. ........ 398/202 |

FOREIGN PATENT DOCUMENTS

| JP | 6-51802 | 2/1994 |
| JP | 2002-305438 A | 10/2002 |
| JP | 2002-314488 A | 10/2002 |

* cited by examiner

*Primary Examiner*—Mark Hellner
(74) *Attorney, Agent, or Firm*—Oblon, Spivak, McClelland, Maier & Neustadt, L.L.P.

(57) ABSTRACT

The present invention provides an optical amplifying apparatus having: a CPU 11 for processing various signals; a plurality of circuits 17, 18 for controlling respective devices 4, 9 required for optical amplification; a first storing unit 14 for storing a program supplied from a user a gate array 12 for storing various parameters for controlling the devices 4, 9, the gate array being updated based on the program which is stored in the first storing unit 14 and sent via the CPU 11; a latch unit 13, provided between the gate array 12 and the circuits 17, 18, for interrupting a signal path from the gate array 12 to the circuits 17, 18 after receiving a starting signal of an update from the CPU 11 until the update being finished and for controlling the circuits 17, 18 based on the parameters stored in the gate array 12 before the signal path is interrupted; and a second storing unit 16 for, at least during the update, storing the various parameters which are stored in the gate array 12 before the update.

5 Claims, 6 Drawing Sheets

OPTICAL AMPLIFYING APPARATUS

FIELD OF THE INVENTION

The present invention relates to an optical amplifying apparatus and, more particularly, to an optical amplifying apparatus having a controller using an FPGA (FIELD PROGRAMMABLE GATE ARRAY).

RELATED ART

The WDM (Wavelength Division Multiplexing) system is a system in which plural optical signals of different wavelengths are multiplexed into one optical transmission path. This WDM system adopts a configuration using an optical amplifying apparatus which is provided in an optical transmission path to control power of an optical signal and output the optical signal to the optical transmission path such as a single mode optical fiber (SMF) or a dispersion-shifted optical fiber (DSF).

The optical amplifying apparatus includes an EDF (Erbium Doped Fiber) connected to some midpoint of an optical transmission path, a pumping LD (Laser Diode) for optically pumping the EDF, two PDs (Photo Diodes) for monitoring light input to or output from the EDF and a controller for controlling a driving current of the pumping LD based on outputs from the two PDs.

Figure 6:
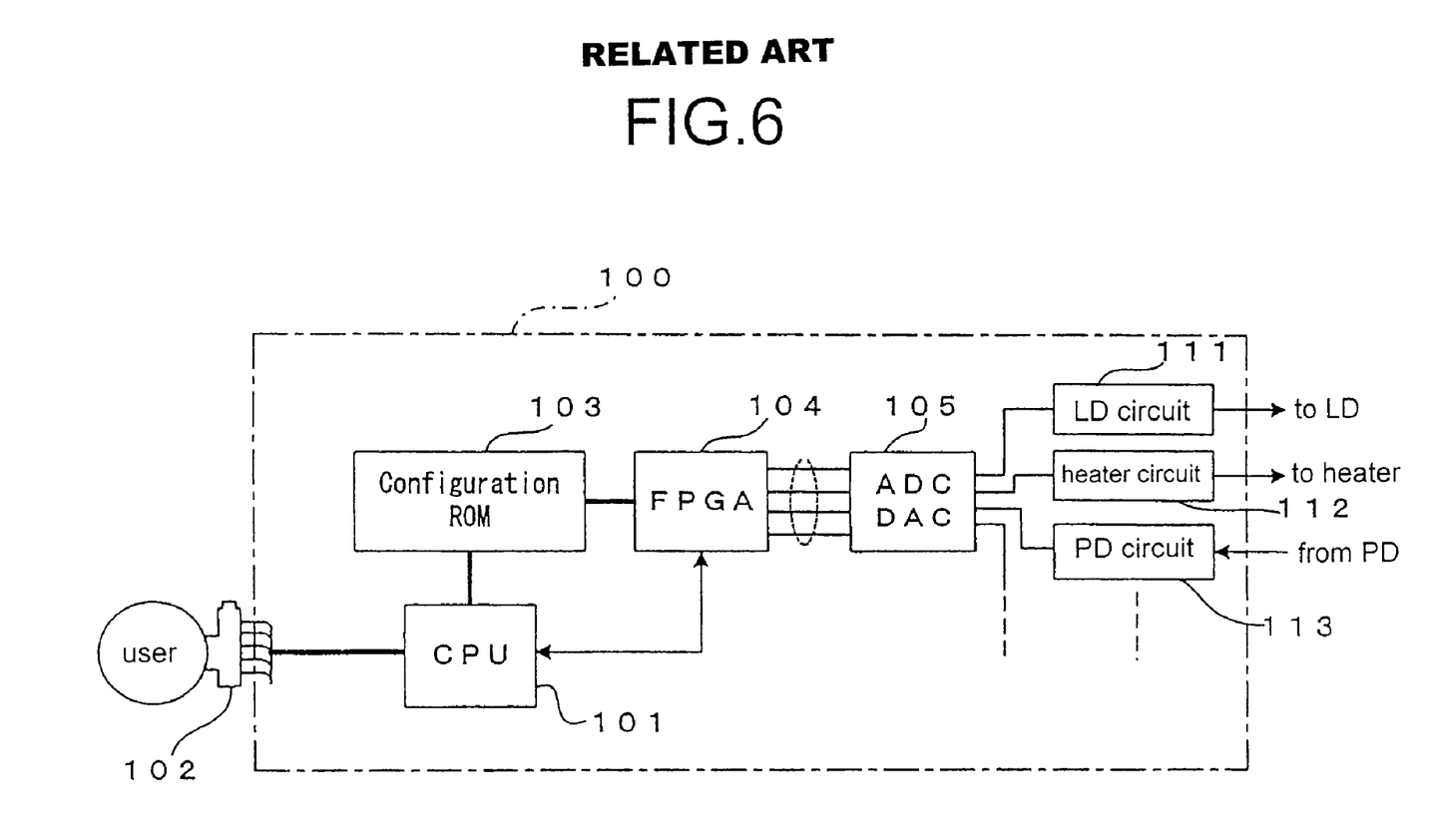
FIG. 6 is a block diagram illustrating a controller of an optical amplifying apparatus according to a conventional art.

FIG. 6 is a circuit diagram illustrating an example of the controller of the optical amplifying apparatus. The controller 100 includes an LD circuit 111 for controlling a driving current of the pumping LD, a heater circuit 112 for controlling the temperature of an EDF heater, a PD circuit 113 receiving detected signals of the PDs, a configuration ROM (Read Only Memory) 103 holding programs input from a user interface 102 via a CPU 101, an FPGA 104 for controlling the LD circuit 111, the heater circuit 112 and the like, an AD converter/DA converter 105 for performing DA conversion on a signal from the FPGA 104 to output the signal to the LD circuit 111, the heater circuit 112 and the like and performing AD conversion on signals from the PD circuit 113 and the like to output the signals to the FPGA 104, and other circuits.

In such a controller, the CPU 101 and FPGA 104, which are firmware, can be updated or improved in function/performance by rewriting their programs.

In updating of the FPGA 104, the configuration ROM 103 receives data of a program and the like from the user interface 102 and stores the data therein. Then, in response to an update request from the CPU 101, the FPGA 104 has the program rewritten with use of the data stored in the configuration ROM 103. This program rewriting takes about one second, for example. When the program is rewritten, various parameters in the FPGA 104 are reset. That is, the various parameters are also updated via the CPU 101.

FPGA program writing using a configuration element is disclosed, for example, in the following non-patent document 1.

While the FPGA 104 is being updated, the FPGA 104 can not perform various controls of LD driving current and temperature via the LD circuit 111 and the heater circuit 112.

Meanwhile, the following patent document 1 discloses use of two programmable controllers for machine control, of which one controls the machine performance and the other is in the backup mode, and when the one programmable controller is in trouble, the other takes over the control of the machine performance.

Here, with reference to the configuration disclosed in the patent document 1, two FPGAs may be used in the controller of the optical amplifying apparatus, and when one of the FPGAs is being program-updated, the other is used to perform various operations including monitoring of photo diodes, LD driving current control and temperature control.

NON-patent document 1: Cyclone Device Handbook, Volume 1, p. 13-9, Altera Corporation, August 2005

Patent document 1: Japanese Patent Laid-open Publication No. 6(1994)-51802

SUMMARY OF THE INVENTION

Problems to be Solved by the Invention

In the configuration illustrated in FIG. 6, if the FPGA 104 is updated during operation of the optical amplifying apparatus, the FPGA 104 is prevented from performing various operations, which may causes such a problem that control of an optical signal propagating in the optical amplifying apparatus is interrupted, resulting in communication failure. In addition, as various parameters in the FPGA 104 are erased they are required to be rewritten after updating, which takes a lot of time and effort.

On the other hand, if two FPGAs are used in the optical amplifying apparatus as disclosed in the patent document 1, control of the optical amplifying apparatus is not interrupted. However, this configuration needs to be large-sized and expensive.

The present invention has an object to provide an optical amplifying apparatus which allows simultaneous performance of optical amplification control and FPGA updating without any additional FPGA.

Means for Solving the Problems

In order to solve the above-mentioned problems, a first aspect of the present invention is an optical amplifying apparatus comprising: a CPU for processing various signals; a plurality of circuits for controlling respective devices required for optical amplification; a first storing unit for storing a program supplied from a user; a gate array for storing various parameters for controlling the devices, the gate array being updated based on the program which is stored in the first storing unit and sent via the CPU; a latch unit, provided between the gate array and the circuits, for interrupting a signal path from the gate array to the circuits after receiving a starting signal of an update from the CPU until the update being finished and for controlling the circuits based on the parameters stored in the gate array before the signal path is interrupted; and a second storing unit for, at least during the update, storing the various parameters which are stored in the gate array before the update.

A second aspect of the present invention is an optical amplifying apparatus of the first aspect, in which the devices comprise at least an optically pumping laser diode and the circuits comprise a laser diode circuit for setting a driving current of the laser diode.

A third aspect of the present invention is an optical amplifying apparatus of the second aspect, in which the latch unit is configured to obtain an average value of the driving current of the laser diode which is calculated out by measuring the driving current of the laser diode a predetermined number of times successively before the update is started and to drive the laser diode with the average value during the update.

A fourth aspect of the present invention is an optical amplifying apparatus of the third aspect, in which, after a dither signal output from the gate array is turned off, the gate array measures the driving current the predetermined number of times successively to calculate out the average value.

A fifth aspect of the present invention is an optical amplifying apparatus of any one of the first to fourth aspects, in which the devices comprise a monitoring element for monitoring an optical signal propagating in an optical fiber, and a detected signal from the monitoring element is sent to the CPU via an analog/digital converter.

Effects of the Invention

According to the present invention, when a gate array as firmware is updated, device control to be performed by the gate array is performed instead by a latch unit and various parameters stored in the gate array are temporarily stored in another storing unit for backup. This configuration allows normal control of optical amplification even while the single gate array is being updated and easy reproduction of the various parameters that are deleted from the gate array during the updating.

DESCRIPTION OF REFERENCE NUMERALS

1: EDF
2, 5, 7: optical coupler
3: amplifier
4: pumping laser diode (LD)
9: heater
10: controller
11: CPU
12: FPGA
12a: shared memory
12b: AGC (Auto Gain Control) calculation block
12c: selector
13: latch IC
14: flash ROM
15: user interface
16: SRAM
17: LD circuit
18: heater circuit
19: PD circuit
20: DA converter
21: AD converter

BEST MODE FOR CARRYING OUT THE INVENTION

With reference to the drawings, an embodiment of the present invention will be described in detail below.

Figure 1:
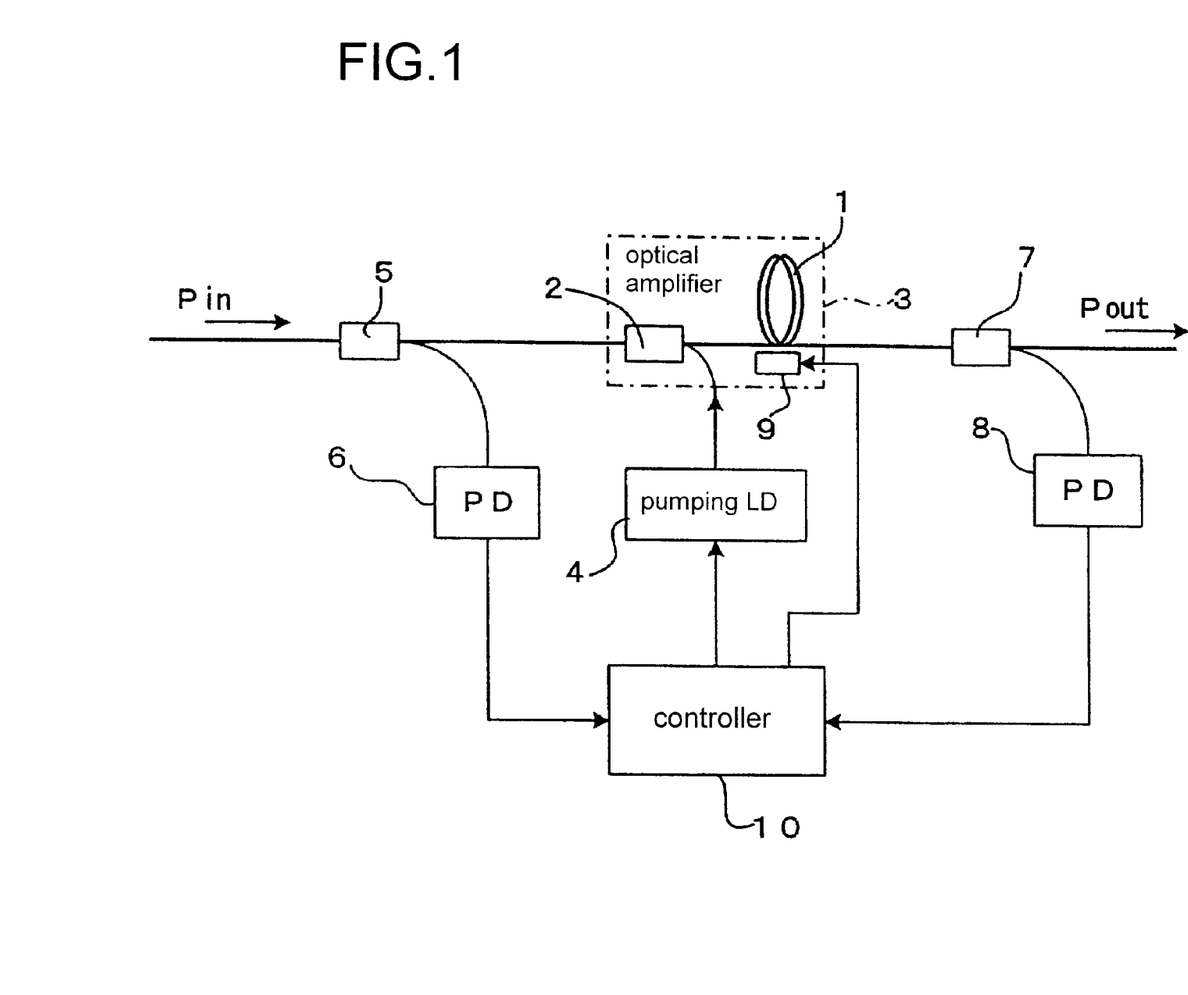
FIG. 1 is a view illustrating a configuration of an optical amplifying apparatus according to one embodiment of the present invention.

FIG. 1 is a view illustrating a configuration of an optical amplifying apparatus according to the embodiment of the present invention.

The optical amplifying apparatus according to the embodiment of the present invention includes: as illustrated in FIG. 1, an optical amplifier 3 including an erbium-doped optical fiber (EDF) 1 connected to an optical transmission path and a first optical coupler 2 connected to the EDF1; a pumping laser diode (LD) 4 emitting optically pumping energy to the EDF 1 via the first optical coupler 2; a first photo diode (PD) 6 receiving via a second optical coupler 5 an optical signal which is to be input to the EDF 1 and performing photoelectric conversion on the optical signal; a second photo diode (PD) 8 receiving via a third optical coupler 7 an optical signal outputted from the optical amplifier 3 and performing photoelectric conversion on the optical signal; a heater 9 controlling the temperature of the EDF 1; and a controller 10 receiving electric signals from the first photo diode 6 and the second photo diode 8 and controlling based on these electric signals a driving current of the pumping LD 4 and the temperature of the heater 9.

Figure 2:
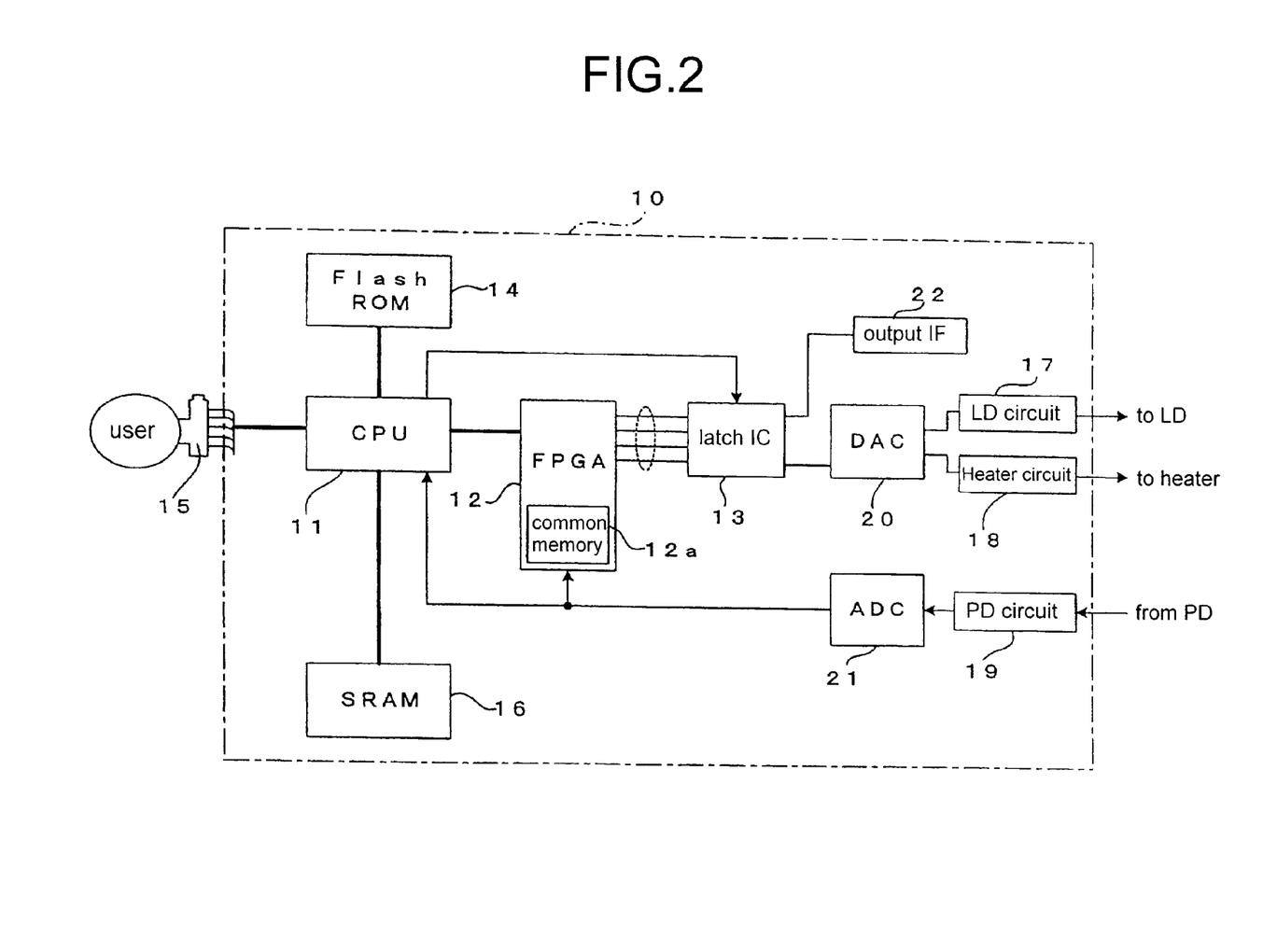
FIG. 2 is a block diagram illustrating a controller of the optical amplifying apparatus according to the embodiment of the present invention.

The controller 10 has:, as illustrated in FIG. 2, a CPU 11 for performing processing such as inputting and outputting of data between devices and controlling of the operation of each device; an FPGA 12 for rewritably storing a program for controlling the pumping LD 4 and the heater 9 and the like and storing various types of data and various parameters; a latch IC 13 for selectively outputting, based on an instruction from the CPU 11, a control signal, which is output from the FPGA 12 in a predetermined operation mode, as it is or an ACC (Auto Current Control) mode control signal based on preset data; a flash ROM 14 for storing programs and data; a user interface 15 for externally acting to store programs in the flash ROM 14 via the CPU 11; a SRAM (Static Random Access Memory) 16 for temporarily storing data of various parameters, which is stored in the FPGA 12, by processing of the CPU 11; an LD circuit 17 for setting the driving current of the pumping LD 4; a heater circuit 18 for setting a heating temperature of the heater; a PD circuit 19 for receiving signals outputted from the PDs 6 and 8; a DA converter 20 for converting a digital signal output from the latch IC 13 to an analog signal to output the signal to the LD circuit 17 and the heater circuit 18; an AD converter 21 for converting an analog signal output from the PD circuit 19 to a digital signal to output the signal to the FPGA 12 and CPU 11; an output interface 22 relaying display signals output from the latch IC 13; and the like.

Figure 3:
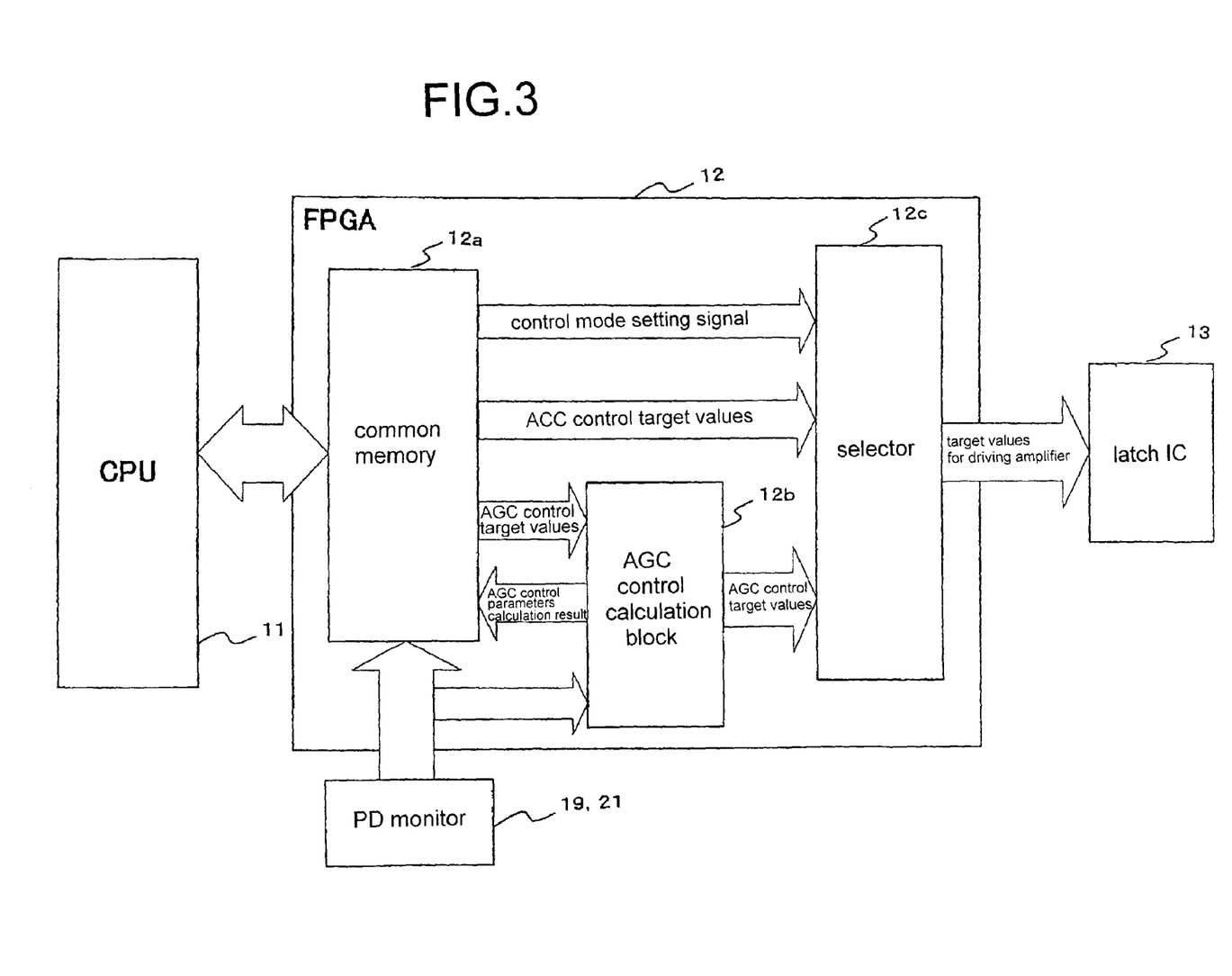
FIG. 3 is a block diagram of an FPGA of the controller of the optical amplifying apparatus according to the embodiment of the present invention.

The FPGA 12 includes, as illustrated in FIG. 3, a shared memory 12a, an AGC calculation block 12b and a selector 12c.

The shared memory 12a is configured to store various parameters and data including a parameter to be output to the LD circuit 17 for making a driving current and a dither signal pass to the pumping LD 4, a parameter to be output to the heater circuit 18 for controlling the temperature of the heater 9, a parameter to be output to the output interface 22 for external display, signals for selecting the control mode between the ACC mode and the AGC (Auto Gain Control) mode, control target values and detected values of the PDs 6 and 8 received from the PD circuit 19 via the AD converter 21 and also to output a signal for setting a control mode in response to a signal from the CPU 11 and ACC and AGC target values.

Besides, the AGC calculation block 12b is configured to calculate parameters for AGC so as to control optical amplification in the AGC mode based on a control signal from the CPU 11 until program data is sent from the user interface 15 to the flash ROM 14. For example, the AGC calculation block 12b calculates various parameters including a driving current of the pumping LD 4 based on the detected values of the PDs 6 and 8 received from the PD circuit 19 via the AD converter 21 in such a manner as to attain a gain target value of input/output power with an optical signal, then, outputs the calculated AGC parameters to the shared memory 12a and sends AGC target values obtained based on the calculation result to the selector 12c.

The selector 12c is configured to selectively output ACC target values or AGC target values to the latch IC 13 based on a control mode setting signal from the shared memory 12a. Here, the ACC target values include a parameter for controlling a driving current, dither signal and the like to keep optical power output from the pumping laser diode 4 constant.

Next description is made about updating of an FPGA 12 program in the above-mentioned controller 10 of the optical amplifying apparatus.

First, the controller 10 operates in the AGC mode in accordance with a pre-update program. That is, in the FPGA 12 illustrated in FIG. 3, the shared memory 12a sends the selector 12c a signal for setting the AGC mode as control mode, and AGC target values sent from the shared memory 12a are selected to control the LD circuit 17, the heater circuit 18 and the like via the latch IC 13 in such a manner as to obtain a predetermined gain in the AGC mode.

The AGC target values are calculated out by the AGC calculation block 12b based on detected values of the first PD 6 and the second PD 8 received from the AD converter 21 and the various parameters so as to have a target value of gain. The thus-obtained target values of the parameters are output from the selector 12c to the latch IC 13. In this case, upon receiving the target values from the FPGA 12, the latch IC 13 then outputs the target values as they are to the output interface 22 or outputs to the LD circuit 17 and the heater circuit 18 via the DA converter 20.

Upon receiving the target values, the LD circuit 17 outputs a driving current and a dither signal to the pumping LD 4 while the heater circuit 18 outputs a control signal to control the temperature of the heater 9. Besides, the output interface 22 outputs a signal for controlling a display unit.

Figure 4:
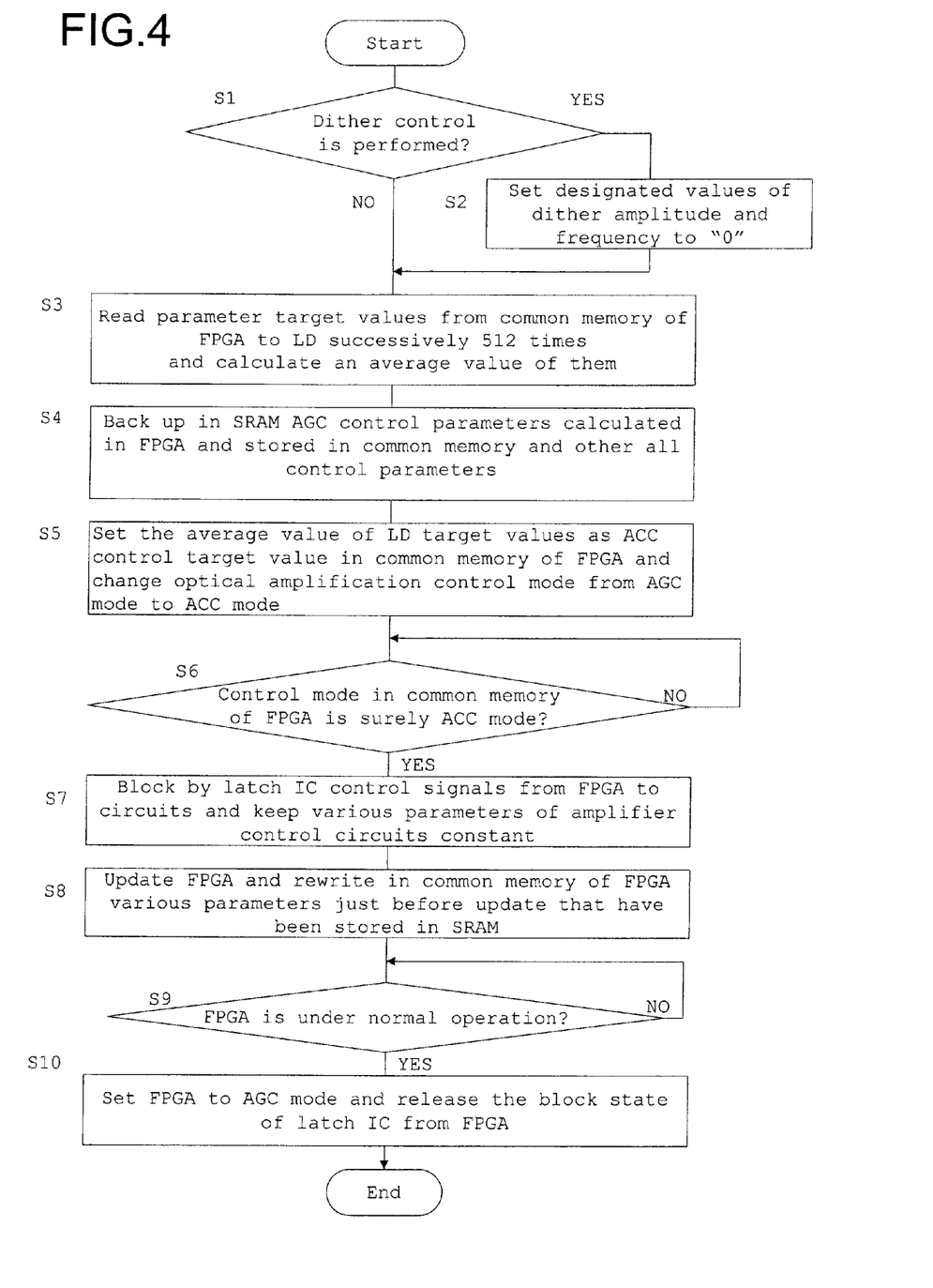
FIG. 4 is a flow chart showing control performed during update of the FPGA of the controller of the optical amplifying apparatus according to the embodiment of the present invention.

During such AGC mode operation, when an updated program is output from the user interface 15 to the controller 10, the CPU 11 in the controller 10 stores the program output from the user interface 15 in the flash ROM 14 and controls the FPGA 12 in accordance with the flowchart shown in FIG. 4.

In FIG. 4, first it is determined in the AGC mode control by the FPGA 12 whether the pumping LD 4 is controlled by a dither signal or not (S1 in FIG. 4). When control by a dither signal is performed, amplitude and a frequency of the dither signal are set to "0" (S2 in FIG. 4).

Then, a target value of the driving current of the pumping LD 4 calculated by the AGC calculation block 12b is read by the shared memory 12a repeatedly, for example, 512 times, and the target values obtained by repeated calculation are used to obtain an average value thereof. This average value is then set as a target value of the driving current of the pumping LD 4 in the ACC mode operation (S3 in FIG. 4). Here, when the shared memory 12a is used to read the target value of the driving current continuously plural times, the dither signal is set to be invalid and therefore, the calculated target value hardly varies depending on measurement timing.

Further, the various parameters for AGC calculated and stored in the shared memory 12a and all other parameters are stored in the SRAM 16 for backup by the CPU 11 (S4 in FIG. 4).

This is followed by the CPU 11 sending a mode switching signal to the FPGA 12 and thereby, the control mode output from the shared memory 12a to the selector 12c is switched from the AGC mode to the ACC mode, and target values of the ACC mode including an average target value of the driving current of the pumping LD 4 obtained while disabling the dither signal are sent to the selector 12c (S5 in FIG. 4). Then, the selector 12c outputs the ACC target signals to the LD circuit 17 and the like via the latch IC 13 and has the ACC target signals and their parameters stored in the latch IC 13.

Then, the CPU 11 confirms that the control mode of the shared memory 12a of the FPGA 12 becomes the ACC mode (S6 in FIG. 4).

Later, the CPU 11 sends a control signal to the latch IC 13 and blocks control signals and data from the FPGA 12 to the latch IC 13. On the other hand, the ACC mode control signals and parameters stored in the latch IC 13 are continuously sent via the DA converter 20 to the LD circuit 17, the heater circuit 18 and the like, and control signals are also sent to the output interface 22 (S7 in FIG. 4).

After the ACC mode control held by the latch IC 13 is started, the CPU 11 erases the program and data in the FPGA 12 and writes in the FPGA 12 program data stored in the flash ROM 14 to update the FPGA program. Then, various parameters and other data saved in the SRAM are written again in the shared memory 12a of the FPGA 12 (S8 in FIG. 4). At this time, a parameter regarding the dither signal is also read from the SRAM 16 and written again in the shared memory 12a thereby to enable control by way of dither signals again.

Then, as the latch IC 13 controls the pumping LD 4, the heater 9 and the like, control to the optical amplifying apparatus is kept on during program updating of the FPGA 12. Further, as detected values of the photo diodes 6 and 8 are also input to the CPU 11 via the PD circuit 19 and the AD converter 21, for example, such processing may be possible that the CPU 11 stops optical amplification when a detected signal of the first PD connected to the input side of the EDF1 is zero.

After the FPGA 12 updating is finished and restarted, the CPU 11 checks to see if the FPGA 12 operates normally (S9 in FIG. 4)

As AGC mode control becomes possible in this state, the CPU 11 controls the FPGA 12 to change the control mode set at the selector 12c by the shared memory 12a from the ACC mode to the AGC mode and to calculate various parameters for AGC mode by way of the AGC calculation block 12b to make the selector 12a output an AGC signal and AGC target values to the latch IC 13.

Then, block state from the FPGA 12 to the latch IC 13 is released by the CPU 11 while the AGC mode control signal and target values controlled by the FPGA 12 are made to pass through the latch IC 13 to be output to the DA converter 20 and the output interface 22 (S10 in FIG. 4).

Thus, the pumping LD 4 and the heater 9 are controlled by the various parameters of the AGC mode.

Here, the operation of the optical amplifier was checked in the three phases of while the FPGA program was being updated following the above-described flow and before and after the program was updated. This check result reveals that optical input and output of the EDF1 were not changed nor interrupted which the FPGA program was updated and the optical amplification was continuously controlled.

Figure 5:
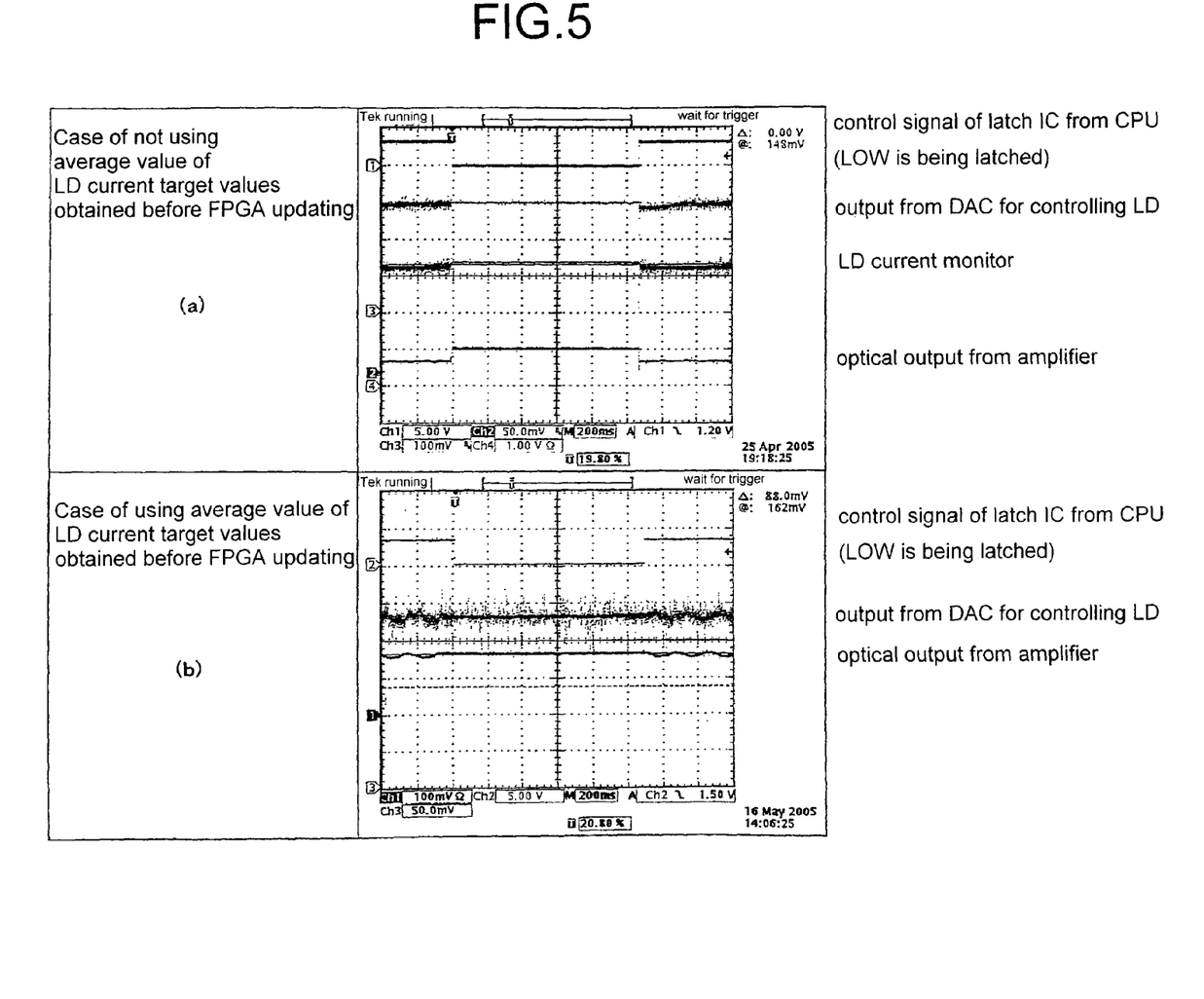
FIGS. 5(a) and 5(b) are wave form charts showing outputs from the optical amplifying apparatus, one is of the case where an LD current target value is not averaged before the FPGA of the controller of the optical amplifying apparatus according to the embodiment of the present invention is updated, and the other is of the case when the LD current target value is averaged.

Meanwhile, comparison was made between the case where the driving current target value of the pumping LD 4 was averaged before the program of the FPGA 12 was updated and the case where the driving current target value was not averaged, which is shown in FIGS. 5(*a*) and 5(*b*).

FIG. 5(*a*) is a graph of the case where the driving current target value of the pumping LD 4 was not averaged, showing fluctuation of an optical output from the EDF1 between the time when the pumping LD 4 was controlled by the latch IC 13 and the time when the pumping LD 4 was controlled by the FPGA 12.

On the other hand, FIG. 5(*b*) is a graph of the case where the driving current target value of the pumping LD 4 was averaged, showing no fluctuation of an optical output from the EDF1 occurring between the time when the pumping LD 4 was controlled by the latch IC 13 and the time when the pumping LD 4 was controlled by the FPGA 12.

These results show that when the driving current of the pumping LD 4 is controlled by the latch IC 13 in the ACC mode, it is necessary to first obtain an average value of the driving current of the pumping LD 4 controlled by the FPGA 12 in the AGC mode while no dither signal is disabled, and then, to use this average value as a driving current value in the ACC mode, thereby assuring stable optical amplification even during program updating of the FPGA 12.

The invention claimed is:

1. An optical amplifying apparatus comprising:
   a CPU for processing various signals;
   a plurality of circuits for controlling respective devices required for optical amplification;
   the respective devices for optically amplifying an input optical signal;
   a first storing unit for storing a program supplied from a user;
   a gate array for storing various parameters for controlling the respective devices, the gate array being updated based on the program which is stored in the first storing unit and sent via the CPU;
   a latch unit, provided between the gate array and the circuits, for interrupting a signal path from the gate array to the circuits after receiving a starting signal of an update from the CPU until the update being finished and for controlling the circuits based on the parameters stored in the gate array before the signal path is interrupted; and
   a second storing unit for, at least during the update, storing the various parameters which are stored in the gate array before the update.

2. The optical amplifying apparatus of claim 1, wherein the respective devices comprise at least an optically pumping laser diode and the circuits comprise a laser diode circuit for setting a driving current of the laser diode.

3. The optical amplifying apparatus of claim 2, wherein the latch unit is configured to obtain an average value of the driving current of the laser diode which is calculated out by measuring the driving current of the laser diode a predetermined number of times successively before the update is started and to drive the laser diode with the average value during the update.

4. The optical amplifying apparatus of claim 3, wherein, after a dither signal output from the gate array is turned off, the gate array measures the driving current the predetermined number of times successively to calculate out the average value.

5. The optical amplifying apparatus of any one of claims 1 to 4, wherein the respective devices comprise a monitoring element for monitoring the optical signal propagating in an optical fiber, and a detected signal from the monitoring element is sent to the CPU via an analog/digital converter.

* * * * *